(12) United States Patent
Lohr et al.

(10) Patent No.: US 11,582,160 B2
(45) Date of Patent: Feb. 14, 2023

(54) DISCARDING RADIO LINK CONTROL SERVICE DATA UNITS

(71) Applicant: LENOVO (BEIJING) LIMITED, Beijing (CN)

(72) Inventors: Joachim Lohr, Wiesbaden (DE); Prateek Basu Mallick, Dreieich (DE); Lianhai Wu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/276,126

(22) PCT Filed: Sep. 27, 2018

(86) PCT No.: PCT/CN2018/107995
§ 371 (c)(1),
(2) Date: Mar. 13, 2021

(87) PCT Pub. No.: WO2020/061912
PCT Pub. Date: Apr. 2, 2020

(65) Prior Publication Data
US 2022/0038381 A1    Feb. 3, 2022

(51) Int. Cl.
*H04L 47/32* (2022.01)
*H04L 47/28* (2022.01)
(Continued)

(52) U.S. Cl.
CPC .............. *H04L 47/32* (2013.01); *H04L 47/28* (2013.01); *H04L 47/34* (2013.01); *H04L 69/28* (2013.01);
(Continued)

(58) Field of Classification Search
None
See application file for complete search history.

(56) References Cited

U.S. PATENT DOCUMENTS 10,313,947 B1 * 6/2019 Sung ............... H04W 36/00837
2015/0264615 A1   9/2015 Zhao et al.
(Continued)

FOREIGN PATENT DOCUMENTS

CN      102640441 A     8/2012
WO   WO-2009038365 A2 *  3/2009 ........... H04L 1/1877
(Continued)

OTHER PUBLICATIONS

3GPP, 3rd Generation Partnership Project; Technical Specification Group Radio Access Network; RLC UM SDU segment discard, 3GPP R2-1801998, Feb. 26-Mar. 2, 2018, pp. 1-3.
(Continued)

*Primary Examiner* — Anh Vu H Ly
(74) *Attorney, Agent, or Firm* — Kunzler Bean & Adamson

(57) ABSTRACT

Apparatuses, methods, and systems are disclosed for discarding radio link control service data units. One method (700) includes sending (702) at least a portion of a radio link control service data unit. The method (700) includes receiving (704) an indication from a packet data convergence protocol layer to discard the radio link control service data unit after sending at least the portion of the radio link control service data unit. The method (700) includes, in response to receiving the indication to discard the radio link control service data unit, transmitting (706) information indicating to discard the radio link control service data unit.

18 Claims, 9 Drawing Sheets

(51) Int. Cl.
*H04L 47/34* (2022.01)
*H04L 69/28* (2022.01)
*H04W 28/02* (2009.01)
*H04W 80/02* (2009.01)
*H04W 8/04* (2009.01)

(52) U.S. Cl.
CPC ......... *H04W 8/04* (2013.01); *H04W 28/0236* (2013.01); *H04W 80/02* (2013.01)

(56) References Cited

U.S. PATENT DOCUMENTS

2016/0352643 A1* 12/2016 Xiao ................. H04L 47/32
2019/0053326 A1*  2/2019 Lee .................. H04L 1/188
2020/0235869 A1*  7/2020 Pradas ............... H04L 1/188

FOREIGN PATENT DOCUMENTS

| WO | 2009145420 A1 | 12/2009 | | |
|----|---|---|---|---|
| WO | 2017191918 A2 | 11/2017 | | |
| WO | WO-2019190037 A1 * | 10/2019 | ........... | H04L 1/1874 |

OTHER PUBLICATIONS

International Searching Authority, "Notification of Transmittal of the International Search Report and the Written Opinion of the International Searching Authority, or the Declaration", PCT/CN2018/107995, dated Sep. 27, 2018, pp. 1-7.

\* cited by examiner

DISCARDING RADIO LINK CONTROL SERVICE DATA UNITS

FIELD

The subject matter disclosed herein relates generally to wireless communications and more particularly relates to discarding radio link control service data units.

BACKGROUND

The following abbreviations are herewith defined, at least some of which are referred to within the following description: Third Generation Partnership Project ("3GPP"), Acknowledge Mode ("AM"), Backhaul ("BH"), Broadcast Multicast ("BM"), Base Station ("BS"), Bandwidth Part ("BWP"), Component Carrier ("CC"), Coordinated Multipoint ("CoMP"), Control Plane ("CP"), CSI-RS Resource Indicator ("CRI"), Channel State Information ("CSI"), Channel Quality Indicator ("CQI"), Central Unit ("CU"), Codeword ("CW"), Downlink ("DL"), Demodulation Reference Signal ("DMRS"), Data Radio Bearer ("DRB"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), Hybrid Automatic Repeat Request ("HARQ"), Integrated Access Backhaul ("IAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), Logical Channel ("LCH"), Logical Channel Prioritization ("LCP"), Long Term Evolution ("LTE"), Multiple Input Multiple Output ("MIMO"), Mobile-Termination ("MT"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), Packet Switched ("PS"), Quasi Co-Located ("QCL"), Quality of Service ("QoS"), Radio Access Network ("RAN"), Radio Access Technology ("RAT"), Resource Element ("RE"), Rank Indicator ("RI"), Radio Link Failure ("RLF"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Service Data Unit ("SDU"), Subscriber Identity Module ("SIM"), Signal-to-Interference and Noise Ratio ("SINR"), Sequence Number ("SN"), Synchronization Signal ("SS"), SS/PBCH Block ("SSB"), Temporary Mobile Subscriber Identity ("TMSI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Voice Over IP ("VoIP"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, RLC SDUs may be sent. In such networks, certain RLC SDU's may be stored unnecessarily at a device.

BRIEF SUMMARY

Methods for discarding radio link control service data units are disclosed. Apparatuses and systems also perform the functions of the apparatus. In one embodiment, the method includes sending at least a portion of a radio link control service data unit. In various embodiments, the method includes receiving an indication from a packet data convergence protocol layer to discard the radio link control service data unit after sending at least the portion of the radio link control service data unit. In certain embodiments, the method includes, in response to receiving the indication to discard the radio link control service data unit, transmitting information indicating to discard the radio link control service data unit.

An apparatus for discarding radio link control service data units, in one embodiment, includes a processor that sends at least a portion of a radio link control service data unit. In various embodiments, the apparatus includes a receiver that receives an indication from a packet data convergence protocol layer to discard the radio link control service data unit after sending at least the portion of the radio link control service data unit. In some embodiments, the apparatus includes a transmitter that, in response to receiving the indication to discard the radio link control service data unit, transmits information indicating to discard the radio link control service data unit.

In one embodiment, a method for discarding radio link control service data units includes receiving at least a portion of a radio link control service data unit. In various embodiments, the method includes receiving first information indicating to discard the radio link control service data unit after receiving at least the portion of the radio link control data unit.

An apparatus for discarding radio link control service data units, in one embodiment, includes a receiver that: receives at least a portion of a radio link control service data unit; and receives first information indicating to discard the radio link control service data unit after receiving at least the portion of the radio link control data unit.

In one embodiment, a method for discarding radio link control service data units includes receiving at least a portion of a radio link control service data unit. In various embodiments, the method includes starting a timer in response to receiving at least the portion of the radio link control service data unit. In some embodiments, the method includes, in response to the timer expiring, discarding at least the portion of the radio link control service data unit.

An apparatus for discarding radio link control service data units, in one embodiment, includes a receiver that receives at least a portion of a radio link control service data unit. In some embodiments, the apparatus includes a processor that: starts a timer in response to receiving at least the portion of the radio link control service data unit; and in response to the timer expiring, discards at least the portion of the radio link control service data unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
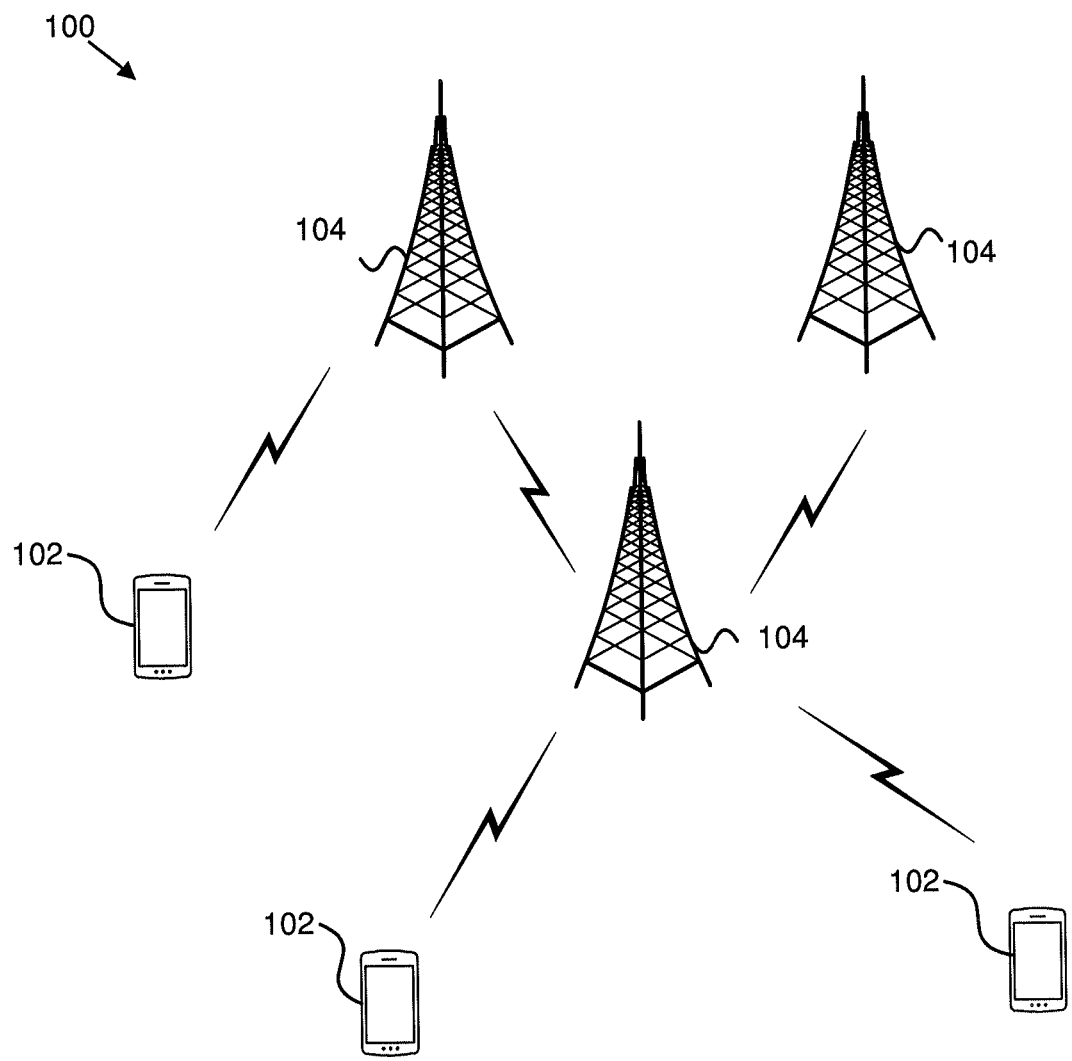
FIG. 1 is a schematic block diagram illustrating one embodiment of a wireless communication system for discarding radio link control service data units.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for discarding radio link control service data units. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may discard radio link control service data units. In various embodiments, the remote unit 102 may send at least a portion of a radio link control service data unit. In various embodiments, the remote unit 102 may receive an indication from a packet data convergence protocol layer to discard the radio link control service data unit after sending at least the portion of the radio link control service data unit. In certain embodiments, the remote unit 102 may, in response to receiving the indication to discard the radio link control service data unit, transmit information indicating to discard the radio link control service data unit. Accordingly, a remote unit 102 may be used for discarding radio link control service data units.

In certain embodiments, a network unit 104 may discard radio link control service data units. In various embodiments, the network unit 104 may receive at least a portion of a radio link control service data unit. In various embodiments, the network unit 104 may receive first information indicating to discard the radio link control service data unit after receiving at least the portion of the radio link control data unit. Accordingly, a network unit 104 may be used for discarding radio link control service data units.

In certain embodiments, a network unit 104 may discard radio link control service data units. In various embodiments, the network unit 104 may receive at least a portion of a radio link control service data unit. In various embodiments, the network unit 104 may start a timer in response to receiving at least the portion of the radio link control service data unit. In some embodiments, the network unit 104 may, in response to the timer expiring, discard at least the portion of the radio link control service data unit. Accordingly, a network unit 104 may be used for discarding radio link control service data units.

Figure 2:
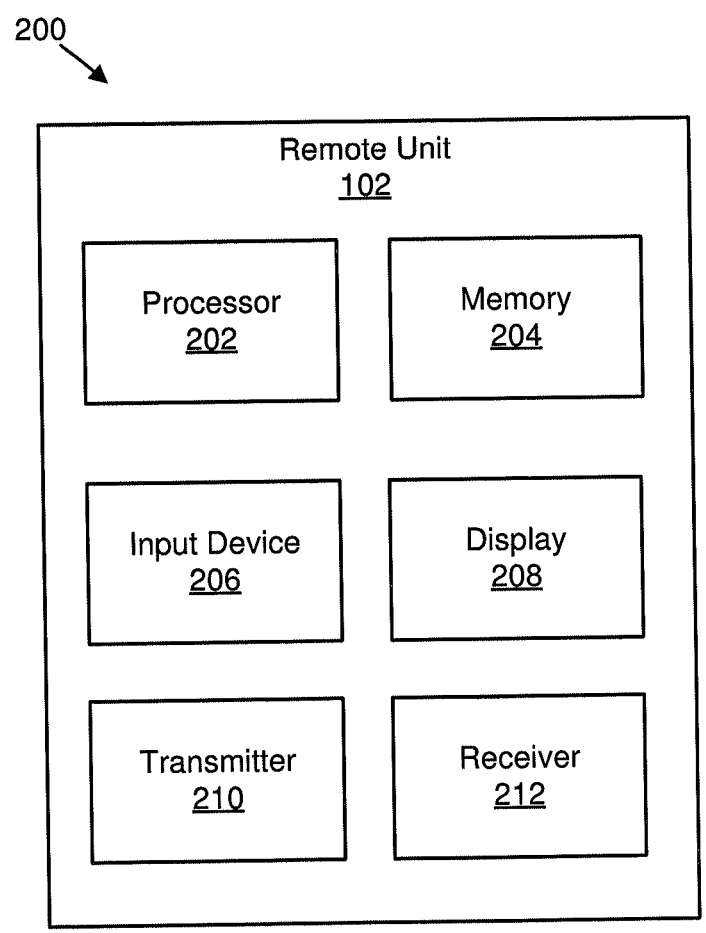
FIG. 2 is a schematic block diagram illustrating one embodiment of an apparatus that may be used for discarding radio link control service data units.

FIG. 2 depicts one embodiment of an apparatus 200 that may be used for discarding radio link control service data units. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may send at least a portion of a radio link control service data unit. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the receiver 212 may receive an indication from a packet data convergence protocol layer to discard the radio link control service data unit after sending at least the portion of the radio link control service data unit. In some embodiments, the transmitter 210 may, in response to receiving the indication to discard the radio link control service data unit, transmit information indicating to discard the radio link control service data unit. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
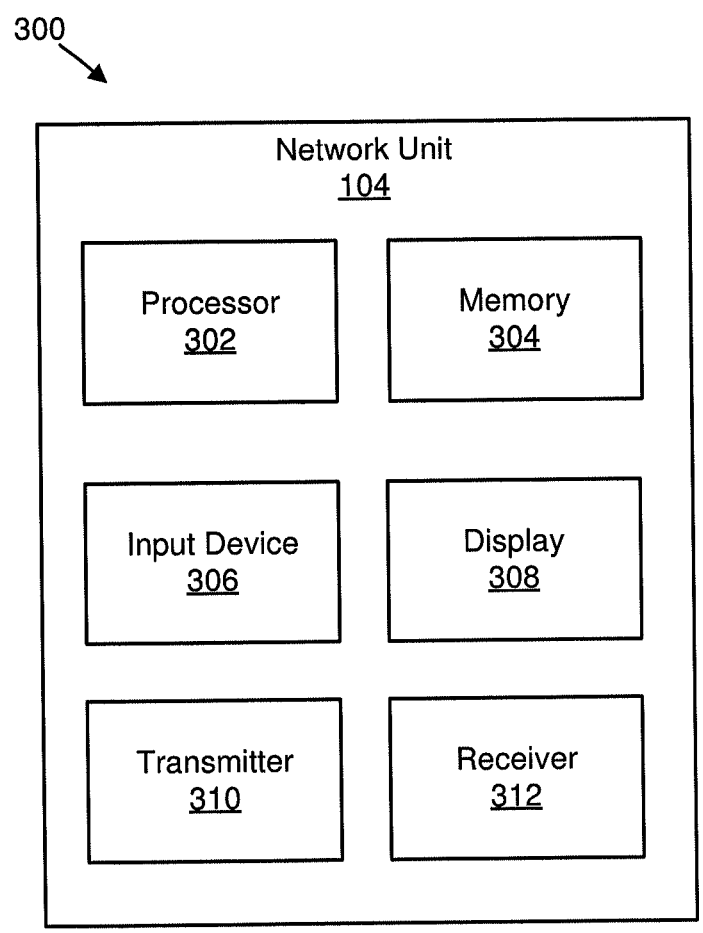
FIG. 3 is a schematic block diagram illustrating one embodiment of an apparatus that may be used for discarding radio link control service data units.

FIG. 3 depicts one embodiment of an apparatus 300 that may be used for discarding radio link control service data units. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312: receives at least a portion of a radio link control service data unit; and receives first information indicating to discard the radio link control service data unit after receiving at least the portion of the radio link control data unit. In some embodiments, the receiver 312 receives at least a portion of a radio link control service data unit. In some embodiments, the processor 302: starts a timer in response to receiving at least the portion of the radio link control service data unit; and, in response to the timer expiring, discards at least the portion of the radio link control service data unit.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
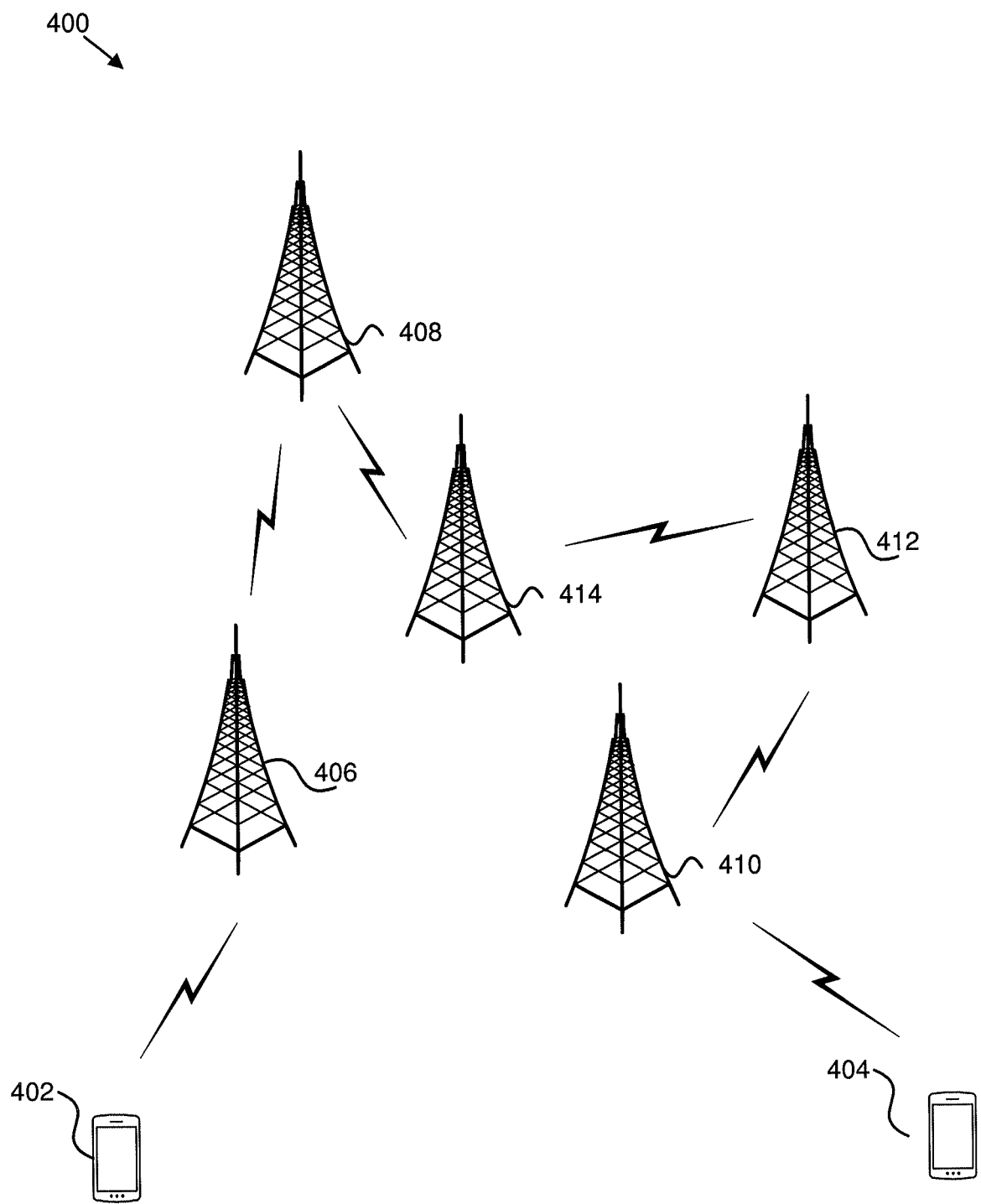
FIG. 4 is a schematic block diagram illustrating one embodiment of an integrated access backhaul system.

FIG. 4 is a schematic block diagram illustrating one embodiment of an integrated access backhaul ("IAB") system 400. The IAB system 400 includes a first UE 402, a second UE 404, a first IAB node 406, an IAB donor node 408, a second IAB node 410, a third IAB node 412, and a fourth IAB node 414. As illustrated, the first UE 402 is connected to the IAB donor node 408 via the first IAB node 406. Moreover, the second UE 404 is connected to the IAB donor node 408 via the second IAB node 410, the third IAB node 412, and the fourth IAB node 414. The IAB system 400, as illustrated, may be used for multi-hop backhauling via multiple IAB nodes.

As may be appreciated, multi-hop backhauling systems may provide a larger range extension than single hop systems. This may especially be beneficial for frequencies above 6 GHz due to a limited range of such frequencies. In some configurations, multi-hop backhauling enables backhauling around obstacles (e.g., buildings).

A maximum number of hops in a deployment may depend on many factors such as frequency, cell density, propagation environment, and traffic load. Thus, flexibility in hop count may be desirable. With an increased number of hops, scalability issues may arise, performance may be limited, and/or signaling load may increase signaling load to undesirable levels.

As may be appreciated, wireless backhaul links may be vulnerable to blockage (e.g., due to moving objects such as vehicles, due to seasonal changes (foliage), due to infrastructure changes (new buildings), and so forth). Such vulnerability may also apply to physically stationary IAB-nodes. In FIG. 4, the first UE 402 may switch from communicating via the first IAB node 406 to communicating with the second IAB node 410 if a backhaul link is blocked by objects (e.g., moving objects). Moreover, traffic variations may create uneven load distribution on wireless backhaul links leading to local link congestion and/or node congestion.

In some embodiments, an IAB node may include MT and DU. The MT function may be a component of a mobile equipment, or, as used herein, MT may be a function residing on an IAB node that terminates radio interface layers of a backhaul Uu interface toward the IAB-donor or other IAB nodes.

In FIG. 4 the IAB nodes may be in a standalone mode which includes one IAB-donor and multiple IAB-nodes. The IAB-donor node 408 may be treated as a single logical node that includes a set of functions such as gNB-DU, gNB-CU-CP, gNB-CU-UP and potentially other functions. In certain embodiments, the IAB-donor node 408 may be split according to its functions which can all be either collocated or non-collocated as allowed by 3GPP NG-RAN architecture.

In some embodiments, an IAB node may multiplex UE DRBs to BH RLC-channels. Various options may be considered for bearer mapping in an IAB node as illustrated in FIGS. 5 and 6.

Figure 5:
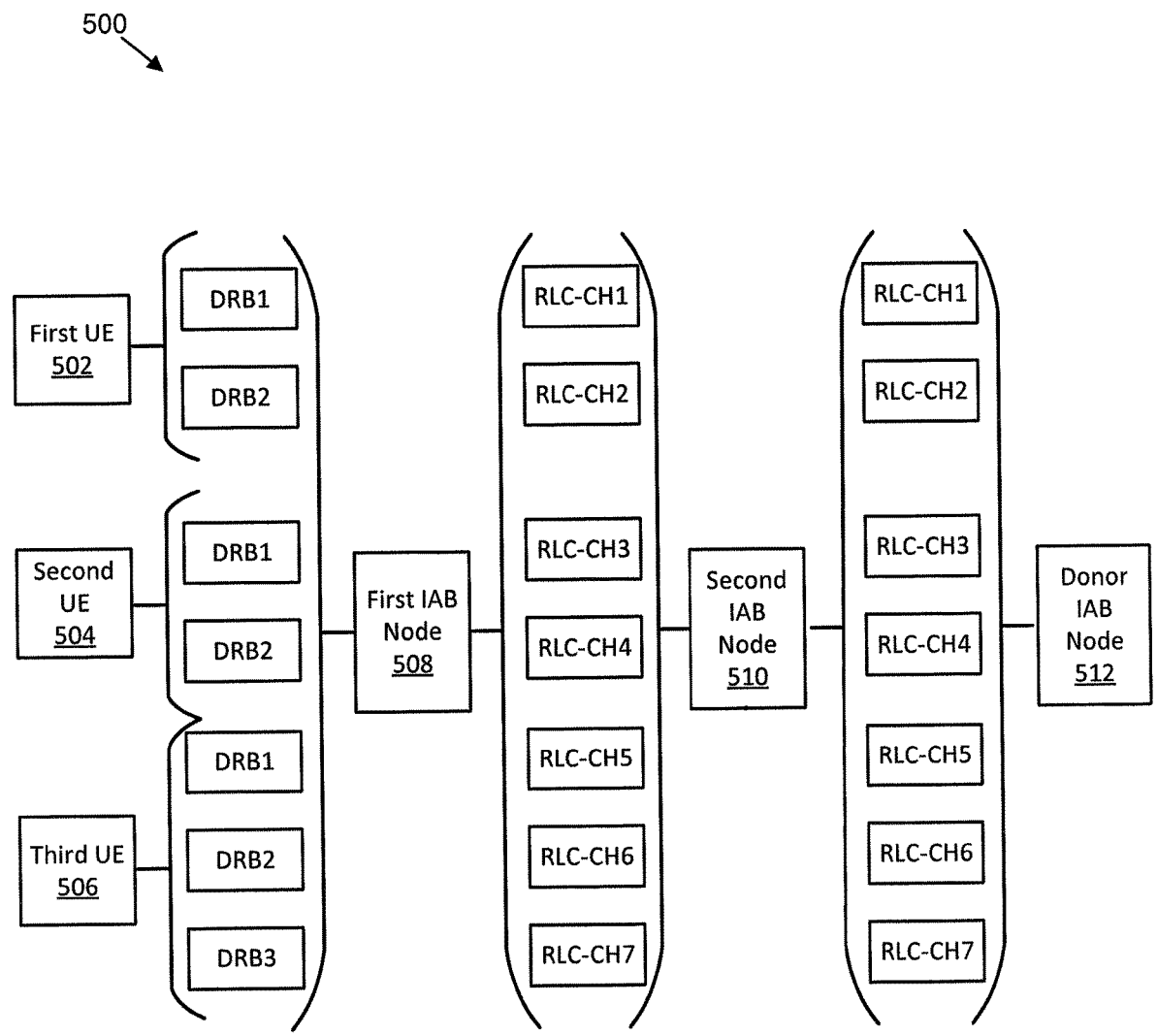
FIG. 5 is a schematic block diagram illustrating one embodiment of a system using one-to-one mapping.
Figure 6:
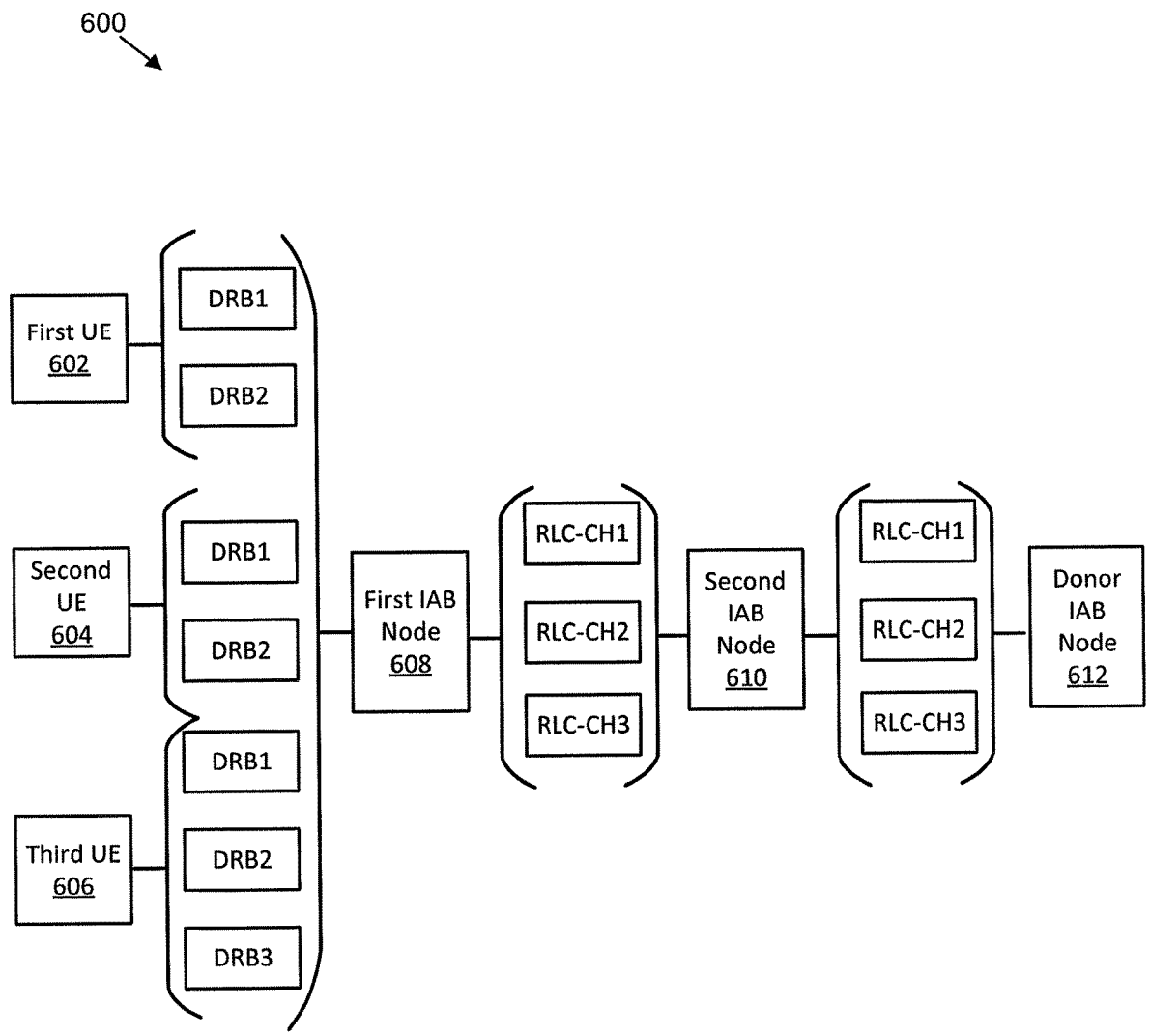
FIG. 6 is a schematic block diagram illustrating one embodiment of a system using many-to-one mapping.

FIG. 5 is a schematic block diagram illustrating one embodiment of a system 500 using one-to-one mapping. The system 500 includes a first UE 502 (e.g., UE1), a second UE 504 (e.g., UE2), a third UE 506 (e.g., UE3), a first IAB node 508, a second IAB node 510, and a donor IAB node 512. In this one-to-one mapping between UE DRBs and BH RLC-channels, each DRB from the UEs is mapped to a separate RLC channel. For example, DRB1 (e.g., VoIP) corresponding to the first UE 502 may be mapped to RLC-CH1 (e.g., RLC-Channel 1=UE1 DRB1), DRB2 (e.g., streaming) corresponding to the first UE 502 may be mapped to RLC-CH2 (e.g., RLC-Channel 2=UE1 DRB2), DRB1 (e.g., VoIP) corresponding to the second UE 504 may be mapped to RLC-CH3 (e.g., RLC-Channel 3=UE2 DRB1), DRB2 (e.g., web browsing) corresponding to the second UE 504 may be mapped to RLC-CH4 (e.g., RLC-Channel 4=UE2 DRB2), DRB1 (e.g., VoIP) corresponding to the third UE 506 may be mapped to RLC-CH5 (e.g., RLC-Channel 5=UE3 DRB1), DRB2 (e.g., web browsing) corresponding to the third UE 506 may be mapped to RLC-CH6 (e.g., RLC-Channel 6=UE3 DRB2), and DRB3 (e.g., streaming) corresponding to the third UE 506 may be mapped to RLC-CH7 (e.g., RLC-Channel 7=UE3 DRB3).

In this embodiment, each UE DRB is mapped onto a separate BH RLC-channel. Furthermore, each BH RLC-channel is mapped onto a separate BH RLC-channel on a next hop (e.g., from the second IAB node 510 to the donor IAB node 512). Accordingly, a number of established BH RLC-channels is equal to a number of established UE DRBs.

In some embodiments, a BH RLC channel may be mapped onto BH LCH. The mapping association can include: one BH RLC-channel mapped onto one BH LCH; or multiple BH RLC-channels mapped onto one BH LCH.

FIG. 6 is a schematic block diagram illustrating one embodiment of a system 600 using many-to-one mapping. The system 600 includes a first UE 602 (e.g., UE1), a second UE 604 (e.g., UE2), a third UE 606 (e.g., UE3), a first IAB node 608, a second IAB node 610, and a donor IAB node 612. In this many-to-one mapping between UE DRBs and BH RLC-channels, many DRB from the UEs are mapped to one RLC channel. For example, DRB1 (e.g., VoIP) corresponding to the first UE 602, DRB1 (e.g., VoIP) corresponding to the second UE 604, and DRB1 (e.g., VoIP) corresponding to the third UE 606 may all be mapped to RLC-CH1 (e.g., RLC-Channel 1=UE1 DRB1+UE2 DRB1+UE3 DRB1), DRB2 (e.g., streaming) corresponding to the first UE 602 and DRB3 (e.g., streaming) corresponding to the third UE 606 may both be mapped to RLC-CH2 (e.g., RLC-Channel 2=UE1 DRB2+UE3 DRB3), and DRB2 (e.g., web browsing) corresponding to the second UE 604 and DRB2 (e.g., web browsing) corresponding to the third UE 606 may both be mapped to RLC-CH3 (e.g., RLC-Channel 3=UE2 DRB2+UE3 DRB2).

Thus, for the many-to-one mapping, several UE DRBs are multiplexed onto a single BH RLC-channel based on specific parameters such as a bearer QoS profile. Other information such as hop-count may also be configured. In some embodiments, the IAB node may multiplex UE DRBs into a single BH RLC-channel even if they belong to different UEs. Furthermore, a packet from one BH RLC-channel may be mapped onto a different BH RLC-Channel on the next hop.

Because a BH RLC-channel multiplexes data from and/or to multiple bearers, and possibly even different UEs, each data block transmitted in a BH RLC-channel may contain an identifier of the UE, DRB, and/or IAB node it is associated with.

Furthermore, in some embodiments, BH RLC channels may be mapped onto a BH LCH in a MAC layer. There may be several mapping options for this. In one embodiment, a one-to-one mapping is established between BH RLC channels and BH LCHs. In another embodiment, several BH RLC channels may be mapped to one LCH.

In certain embodiments, a PDCP discard timer may expire in a UE. In such embodiments, the UE may only discard RLC SDU if neither the RLC SDU nor a segment thereof has been submitted to lower layers for transmission. Furthermore, a transmitting side of an AM RLC entity may not introduce an RLC SN gap when discarding an RLC SDU. As may be appreciated, in an IAB system in which an uplink packet transmission on the backhaul could span over several IAB nodes (e.g., multi-hop backhauling), resource wastage may be large if an RLC SDU is transmitted over several backhaul links even though the packet is discarded at a receiver because a delay budget of the packet has been exceeded (e.g., a timer has expired).

In certain configurations, multiple BH RLC channels are mapped to one BH LCH, and it may not be clear how the resources assigned to a LCH during LCP are distributed among associated BH RLC channels.

In some embodiments, a UE may inform an access IAB node that a PDCP discard timer has expired for an RLC SDU even if the RLC SDU or a segment of the RLC SDU has already been transmitted from the UE to the access IAB node. In such embodiments, the transmitting side of an AM RLC entity may not introduce an RLC SN gap while discarding an RLC SDU. This may be accomplished by assigning a sequence number to discarded RLC SDUs as described herein. In certain embodiments, the UE sends a discard notification message to a network entity ("NE"), such as an access IAB node, if an RLC SDU or a segment thereof for which the discard timer has expired has been already submitted to lower layers (e.g., MAC layer). In some embodiments, the discard notification (e.g., discard timer expiry), may be signaled within an RLC control message to the access IAB node. In such embodiments, the discard notification message may include the information about the PDCP PDUs and/or RLC SDUs that are to be discarded (e.g., sequence numbers such as a PDCP SN identifying the RLC SDUs to be discarded).

In various embodiments, upon reception of a discard notification message, an IAB node may inform its parent IAB node about the RLC SDUs to be discarded (e.g., an IAB node will propagate a received discard notification message to its parent IAB node) if the corresponding RLC SDUs or a segment thereof has been submitted to lower layers (e.g., for transmission).

In certain embodiments, the discard notification message may be transmitted from one IAB Node to another IAB node by means of an RLC control message. In various embodiments, a data delivery status PDU may be used as a discard notification message. In such embodiments, the data delivery status PDU may be specified in an adaptation layer specification to provide information regarding the to-be-discarded PDCP PDUs from the adaptation layer at one IAB node to the adaptation layer at another IAB node. Moreover, the data delivery status PDU may be also used for data recovery, retransmission, and/or rerouting resulting from RLF (e.g., rerouting of PDCP PDUs buffered on intermediate IAB nodes).

As may be appreciated, by informing an access IAB node about a discard timer expiring and/or propagating this information to parent IAB nodes up to the donor node, unnecessary transmissions in an intermediate IAB node may be reduced.

In certain embodiments, a UE is configured by a NE, such as an IAB donor, with information indicating whether the UE should send a discard notification message to the network entity it is connected with (e.g., access IAB node). This configuration may be applicable per UE, for all bearers, for all DRBs, for all bearers using RLC AM mode, and/or per RLC/PDCP entity.

In various embodiments, a transmitting side of an AM RLC entity, or a transmitting UM RLC entity in a UE may discard an RLC SDU if indicated from an upper layer (e.g., PDCP). Such embodiments may apply even if an RLC SDU or a segment thereof has been submitted to lower layers (e.g., for transmission). In some embodiments, if a segment of a RLC SDU for which a discard notification has been received from an upper layer has already been submitted to lower layers for transmission, a UE generates a RLC PDU with a SN set to the SN of the corresponding RLC SDU with an empty payload and submits it to the lower layer (e.g., at a transmission opportunity) to notify a receiving entity that a corresponding RLC SDU is discarded. In certain embodiments, instead of an empty payload, an RLC PDU may contain some information (e.g., fields in the RLC header set to predefined values, etc.) that indicates to the receiving entity that the RLC SDU is discarded. In some embodiments, if receiving an RLC retransmission request from a receiving entity (e.g., RLC status PDU) for a RLC SDU that has been discarded at the transmitting side e.g., due to PDCP discard timer expiry, a transmitting entity generates an RLC PDU with the SN set to the SN of the corresponding RLC SDU with an empty payload and submits it to lower layer (e.g., at a transmission opportunity) to notify the receiving entity that the corresponding RLC SDU is discarded. In various embodiments, rather than sending an RLC PDU with an empty payload, the RLC PDU may contain some other information (e.g., fields in the RLC header set to some predefined values etc.) that unambiguously indicates to a receiving entity that the RLC SDU is discarded. In some embodiments, upon reception of such an RLC PDU with an empty payload or an RLC PDU with the header fields set to predefined values, an RLC receiving entity will know that the corresponding RLC SDU was discarded. In various embodiments, an RLC receiving entity may discard already received segments of a discarded RLC SDU and may stop a reassembly and/or reordering timer if running for the discarded RLC SDU. In certain embodiments, a receiving entity may not ask for a retransmission of segments of a discarded RLC SDU.

In some embodiments, a UE may propagate a discard indication received from an upper layer to a network entity it is connected with (e.g., an access IAB node). In such embodiments, signaling of the discard notification may be done as other discard notifications found herein. In one embodiment, the UE may be configured by the NE, such as an IAB donor, to indicate to the UE about whether to discard an RLC SDU if the RLC SDU or a segment thereof has been submitted to the lower layers for transmission. The configuration may be done per UE, all bearers, all DRBs, all bearers using RLC AM mode, and/or per RLC/PDCP entity.

In certain embodiments, upon reception of a discard notification message (e.g., from a child IAB node or a UE), a transmitting side of an AM RLC entity or a transmitting UM RLC entity in an IAB node may discard a RLC SDU if the indicated RLC SDU or a segment thereof has been already submitted to lower layers for transmission. In some embodiments, if a segment of an RLC SDU for which a discard notification has been received has already been submitted to lower layers for transmission, an IAB node may generate a RLC PDU with a SN set to the SN of the corresponding RLC SDU with an empty payload and may submit it to the lower layer (e.g., at a transmission opportunity) to notify the receiving entity that the corresponding RLC SDU is discarded. In various embodiments, as an alternative to an empty payload, the RLC PDU may contain some other information (e.g., fields in the RLC header set to some predefined values etc.) that unambiguously indicates to the receiving entity that the RLC SDU is discarded. In certain embodiments, if receiving an RLC retransmission request from a receiving entity (e.g., RLC status PDU) for an RLC SDU that was discarded at a transmitting side due to reception of a discard notification, the transmitting entity may generate an RLC PDU with a SN set to the SN of the corresponding RLC SDU with an empty payload and may submit it to a lower layer (e.g., at a transmission opportunity) to notify the receiving entity that the corresponding RLC SDU is discarded. In certain embodiments, rather than sending an RLC PDU with an empty payload, an RLC PDU may contain other information (e.g., fields in the RLC header set to predefined values etc.) that unambiguously indicates to the receiving entity that the RLC SDU is discarded.

In one embodiment, an JAB node may be configured with a new timer that is used for buffer management. This new timer may be used to inhibit buffer overflow in an IAB node and/or transmitter. Each RLC SDU and/or PDU may stay in a transmission buffer only for the configured time period in an RLC entity. The value of the time period may depend on a delay requirement of a radio bearer. In some embodiments, upon receipt of an RLC SDU and/or PDU from a child JAB node or UE, an RLC transmitter may start a timer for the RLC SDU and/or PDU. Once started, the timer may never stop until it expires. In response to the timer expiring, an RLC transmitting entity may discard a corresponding RLC SDU and/or PDU. Each IAB node between a UE and an IAB donor may be configured with such a timer (e.g., in the RLC layer or in the adaption layer), therefore signaling between the JAB nodes (e.g., propagation of a discard notification message) may not be necessary. In some embodiments, the timer value may be configured by an IAB donor. The IAB donor may consider parameters such as QoS requirements of the bearer and a number of hops between an IAB node and the UE in determining the timer value.

As may be appreciated, multiple backhaul RLC channels may be multiplexed on one logical channel. Because in the legacy NR/LTE specifications there is a one-to-one mapping between an RLC entity and a LCH (e.g., one logical channel has only one associated RLC entity), impact to an LCP procedure may occur because uplink resources are assigned to logical channels during the LCP procedure depending on priority, buffer status, and/or token bucket status, for example. For IAB, one LCH may have multiple associated RLC entities, therefore an assigned UL resource may be distributed among the associated RLC entities.

In some embodiments, a UE distributes assigned resources for a LCH equally among associated RLC channels. The term "equally" may indicate that a same amount of resources on average are assigned to RLC channels associated to the same LCH. Such averaging may be done over a certain time period (e.g., moving average value). In certain embodiments, the UE, if distributing the resources assigned for a LCH among associated RLC channels and/or entities, may avoid segmenting an RLC SDU (or partially transmitted SDU or retransmitted RLC PDU) if the whole SDU (or partially transmitted SDU or retransmitted RLC PDU) fits into remaining resources assigned to a RLC channel. In such embodiments, a prioritisedBitRate and bucketSizeDuration may be assigned per LCH. Furthermore, Bj may be maintained per LCH.

In various embodiments, resources assigned to a LCH during LCP may be distributed among associated RLC channels and/or entities in a decreasing priority order starting with a highest priority RLC channel and/or entity. In such embodiments, each RLC channel and/or entity may have an assigned priority that may be configured by a network entity, such as an IAB donor. Moreover, each LCH may be assigned a priority, as in the NR and/or LTE specification, and the RLC channels and/or entities mapped to the same LCH may be assigned a relative priority. In some embodiments, a ratio may be defined and/or configured based on how assigned resources to the LCH should be distributed among associated RLC channels and/or entities.

In various embodiments, a UE distributes assigned resources for a LCH among associated RLC channels by considering a number of hops for each RLC channel and/or entity (e.g., the UE prioritizes RLC channels and/or entities that carry data of bearers having a large number of backhaul hops). In one example, distribution of grants for a particular LCH among its component RLC channels occur based on a ratio related to a number of hops configured for that RLC channel. Specifically, if 100 bytes are to be given to a LCH for its corresponding PBR/Bj, and the number of hops for the 2 multiplexed RLC channels are 4 and 6, then these corresponding RLC channels end up receiving 60 and 40 bytes of data, respectively.

In some embodiments, token bucket related parameters such a prioritisedBitRate and a bucketSizeDuration are assigned per RLC channel and/or RLC entity. Furthermore, Bj may be maintained per RLC channel. In such embodiments, priority may be assigned per logical channel (e.g., RLC channels mapped to the same LCH have the priority of the LCH). In certain embodiments, an LCP procedure may be performed on an RLC channel and/or RLC entity level, not on a LCH level (e.g., uplink resources are directly assigned to an RLC channel).

Figure 7:
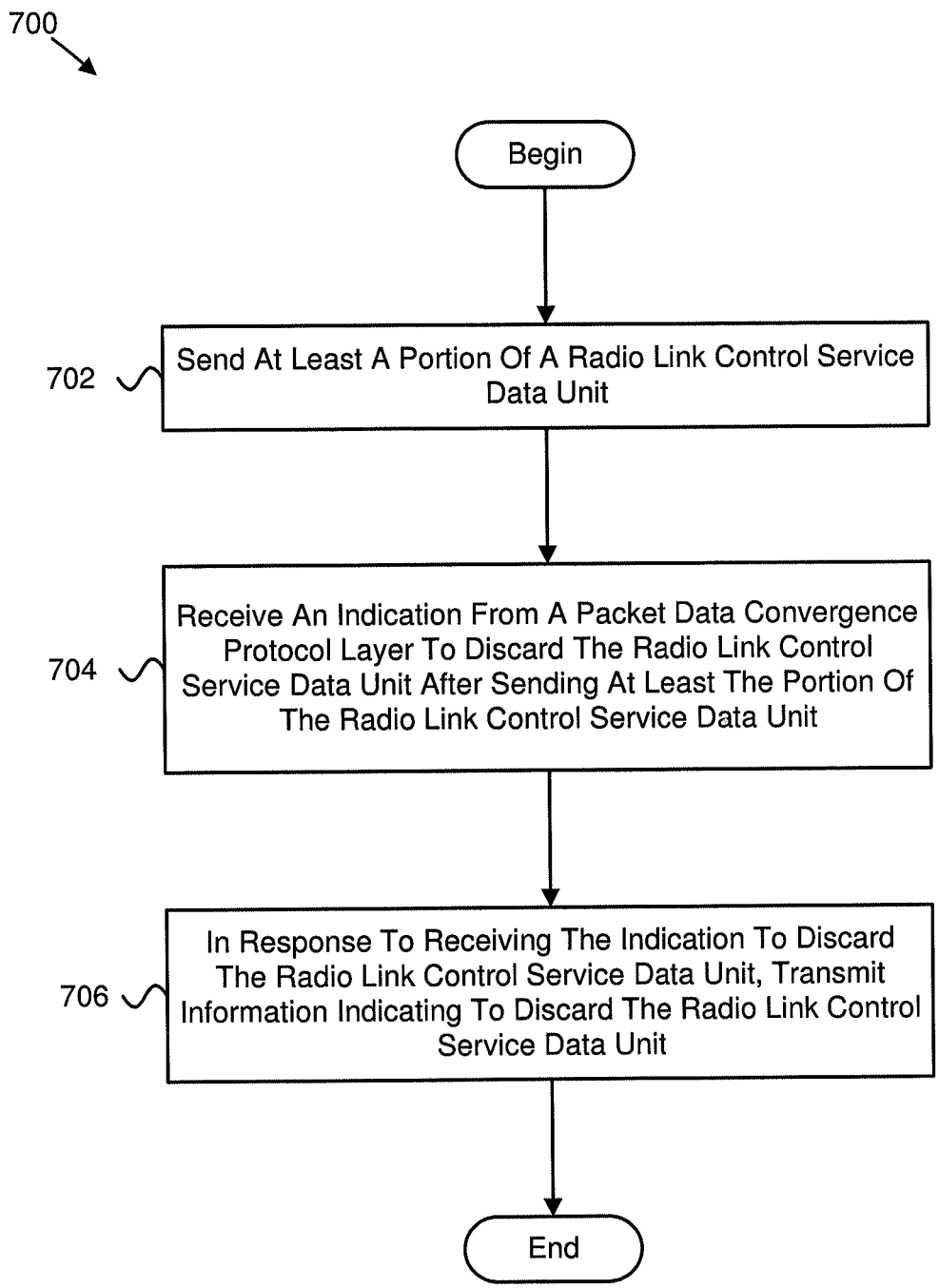
FIG. 7 is a schematic flow chart diagram illustrating one embodiment of a method for discarding radio link control service data units.

FIG. 7 is a schematic flow chart diagram illustrating one embodiment of a method 700 for discarding radio link control service data units. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include sending 702 at least a portion of a radio link control service data unit. In various embodiments, the method 700 includes receiving 704 an indication from a packet data convergence protocol layer to discard the radio link control service data unit after sending at least the portion of the radio link control service data unit. In certain embodiments, the method 700 includes, in response to receiving the indication to discard the radio link control service data unit, transmitting 706 information indicating to discard the radio link control service data unit.

In certain embodiments, sending at least the portion of the radio link control service data unit comprises transmitting at least the portion of the radio link control service data unit to an integrated access backhaul node. In some embodiments, sending at least the portion of the radio link control service data unit comprises submitting at least the portion of the radio link control service data unit to a lower layer for transmission. In various embodiments, at least the portion of the radio link control service data unit comprises an entire radio link control service data unit.

In one embodiment, the information indicating to discard the radio link control service data unit comprises an indication of the radio link control service data unit to be discarded. In certain embodiments, the indication of radio link control service data unit to be discarded comprises a sequence number corresponding to the radio link control service data unit to be discarded. In some embodiments, the sequence number comprises a packet data convergence protocol sequence number.

In various embodiments, the information indicating to discard the radio link control service data unit comprises the sequence number and an empty data payload. In one embodiment, the information indicating to discard the radio link control service data unit comprises the sequence number and a payload comprising data indicating a radio link control service data unit to be discarded. In certain embodiments, transmitting the information indicating to discard the radio link control service data unit comprises transmitting the information via a radio link control control message.

In some embodiments, transmitting the information indicating to discard the radio link control service data unit comprises submitting the information from an upper layer to a lower layer. In various embodiments, the method 700 comprises receiving configuration information that indicates whether to transmit the information indicating to discard the radio link control service data unit. In one embodiment, the method 700 comprises discarding the radio link control service data unit in response to receiving the indication from the packet data convergence protocol layer.

In certain embodiments, the method 700 comprises receiving configuration information that indicates whether to discard the radio link control service data in response to receiving the information indicating to discard the radio link control service data unit.

Figure 8:
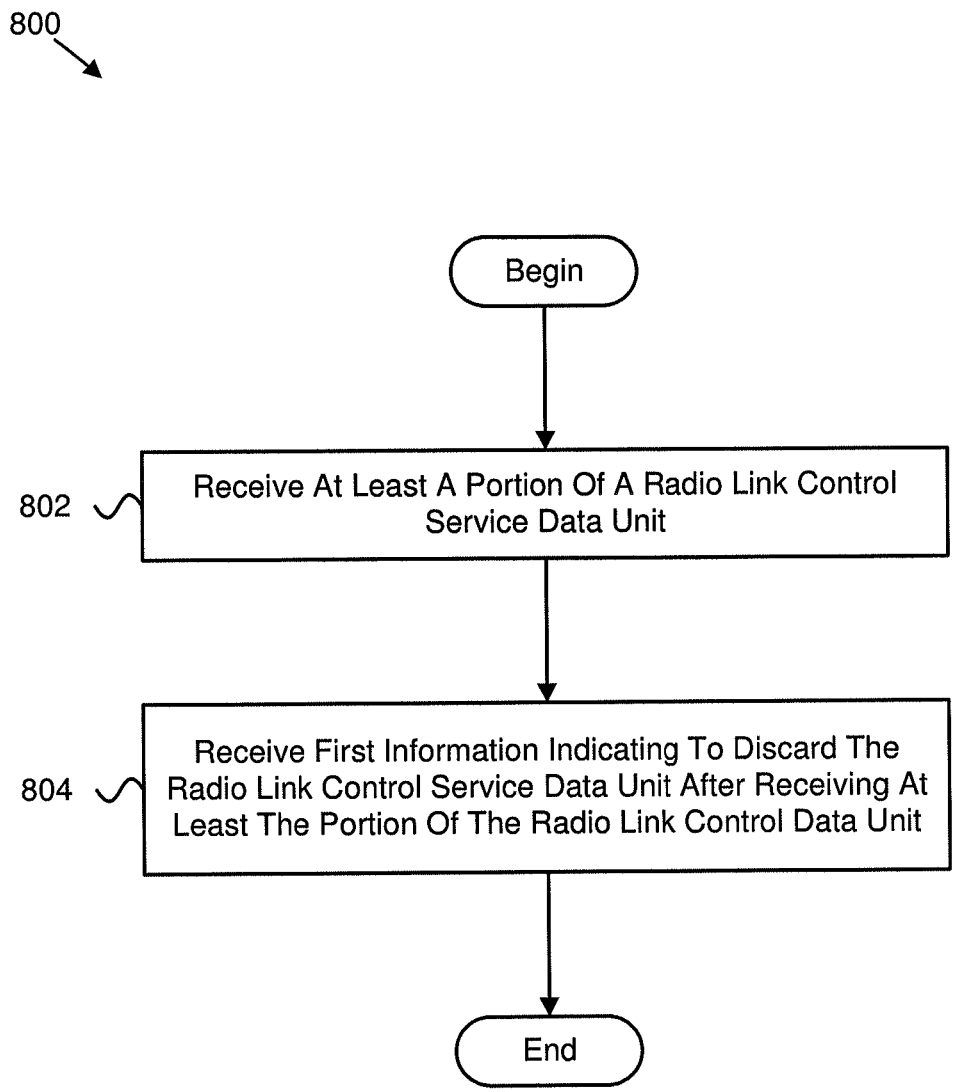
FIG. 8 is a schematic flow chart diagram illustrating another embodiment of a method for discarding radio link control service data units.

FIG. 8 is a schematic flow chart diagram illustrating another embodiment of a method 800 for discarding radio link control service data units. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

The method 800 may include receiving 802 at least a portion of a radio link control service data unit. In various embodiments, the method 800 includes receiving 804 first information indicating to discard the radio link control service data unit after receiving at least the portion of the radio link control data unit.

In certain embodiments, the method 800 comprises transmitting second information indicating to discard the radio link control service data unit. In some embodiments, transmitting the second information comprises transmitting the second information via a radio link control control message. In various embodiments, transmitting the second information comprises transmitting the second information via a data delivery status data message.

In one embodiment, the data deliver status message indicates the radio link control service data unit to be discarded. In certain embodiments, at least the portion of the radio link control service data unit comprises an entire radio link control service data unit. In some embodiments, the first information indicating to discard the radio link control service data unit comprises an indication of the radio link control service data unit to be discarded.

In various embodiments, the indication of radio link control service data unit to be discarded comprises a sequence number corresponding to the radio link control service data unit to be discarded. In one embodiment, the first information indicating to discard the radio link control service data unit comprises the sequence number and an empty payload. In certain embodiments, the first information indicating to discard the radio link control service data unit comprises the sequence number and a payload comprising data indicating a radio link control service data unit to be discarded.

In some embodiments, receiving first information indicating to discard the radio link control service data unit comprises receiving the first information via a radio link control control message. In various embodiments, the method 800 comprises discarding the radio link control service data unit in response to receiving the first information indicating to discard the radio link control service data unit.

Figure 9:
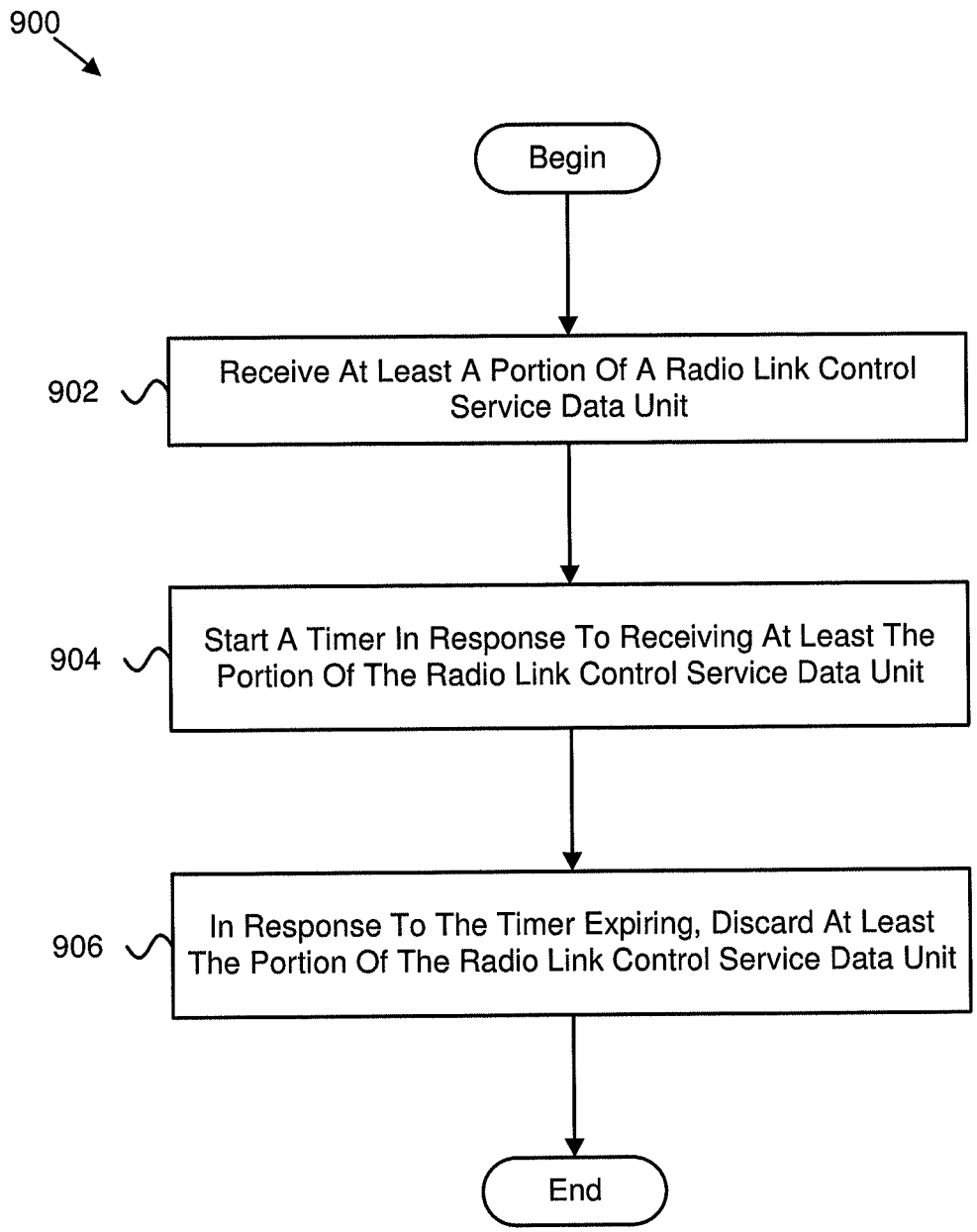
FIG. 9 is a schematic flow chart diagram illustrating a further embodiment of a method for discarding radio link control service data units.

FIG. 9 is a schematic flow chart diagram illustrating a further embodiment of a method for discarding radio link control service data units. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

The method 900 may include receiving 902 at least a portion of a radio link control service data unit. In various embodiments, the method 900 includes starting 904 a timer in response to receiving at least the portion of the radio link control service data unit. In some embodiments, the method 900 includes, in response to the timer expiring, discarding 906 at least the portion of the radio link control service data unit.

In certain embodiments, the method 900 comprises receiving information indicating a starting value for the timer. In some embodiments, the starting value for the timer is determined based on quality of service requirements, a number of hops, or a combination thereof.

In one embodiment, a method comprises: sending at least a portion of a radio link control service data unit; receiving an indication from a packet data convergence protocol layer to discard the radio link control service data unit after sending at least the portion of the radio link control service data unit; and in response to receiving the indication to discard the radio link control service data unit, transmitting information indicating to discard the radio link control service data unit.

In certain embodiments, sending at least the portion of the radio link control service data unit comprises transmitting at least the portion of the radio link control service data unit to an integrated access backhaul node.

In some embodiments, sending at least the portion of the radio link control service data unit comprises submitting at least the portion of the radio link control service data unit to a lower layer for transmission.

In various embodiments, at least the portion of the radio link control service data unit comprises an entire radio link control service data unit.

In one embodiment, wherein the information indicating to discard the radio link control service data unit comprises an indication of the radio link control service data unit to be discarded.

In certain embodiments, the indication of radio link control service data unit to be discarded comprises a sequence number corresponding to the radio link control service data unit to be discarded.

In some embodiments, the sequence number comprises a packet data convergence protocol sequence number.

In various embodiments, the information indicating to discard the radio link control service data unit comprises the sequence number and an empty data payload.

In one embodiment, the information indicating to discard the radio link control service data unit comprises the sequence number and a payload comprising data indicating a radio link control service data unit to be discarded.

In certain embodiments, transmitting the information indicating to discard the radio link control service data unit comprises transmitting the information via a radio link control control message.

In some embodiments, transmitting the information indicating to discard the radio link control service data unit comprises submitting the information from an upper layer to a lower layer.

In various embodiments, the method comprises receiving configuration information that indicates whether to transmit the information indicating to discard the radio link control service data unit.

In one embodiment, the method comprises discarding the radio link control service data unit in response to receiving the indication from the packet data convergence protocol layer.

In certain embodiments, the method comprises receiving configuration information that indicates whether to discard the radio link control service data in response to receiving the information indicating to discard the radio link control service data unit.

In one embodiment, an apparatus comprises: a processor that sends at least a portion of a radio link control service data unit; a receiver that receives an indication from a packet data convergence protocol layer to discard the radio link control service data unit after sending at least the portion of the radio link control service data unit; and a transmitter that, in response to receiving the indication to discard the radio link control service data unit, transmits information indicating to discard the radio link control service data unit.

In certain embodiments, sending at least the portion of the radio link control service data unit comprises transmitting at least the portion of the radio link control service data unit to an integrated access backhaul node.

In some embodiments, sending at least the portion of the radio link control service data unit comprises submitting at least the portion of the radio link control service data unit to a lower layer for transmission.

In various embodiments, at least the portion of the radio link control service data unit comprises an entire radio link control service data unit.

In one embodiment, the information indicating to discard the radio link control service data unit comprises an indication of the radio link control service data unit to be discarded.

In certain embodiments, the indication of radio link control service data unit to be discarded comprises a sequence number corresponding to the radio link control service data unit to be discarded.

In some embodiments, the sequence number comprises a packet data convergence protocol sequence number.

In various embodiments, the information indicating to discard the radio link control service data unit comprises the sequence number and an empty data payload.

In one embodiment, the information indicating to discard the radio link control service data unit comprises the sequence number and a payload comprising data indicating a radio link control service data unit to be discarded.

In certain embodiments, the transmitter transmits the information indicating to discard the radio link control service data unit by transmitting the information via a radio link control control message.

In some embodiments, the transmitter transmits the information indicating to discard the radio link control service data unit by submitting the information from an upper layer to a lower layer.

In various embodiments, the receiver receives configuration information that indicates whether to transmit the information indicating to discard the radio link control service data unit.

In one embodiment, the processor discards the radio link control service data unit in response to receiving the indication from the packet data convergence protocol layer.

In certain embodiments, the receiver receives configuration information that indicates whether to discard the radio link control service data in response to receiving the information indicating to discard the radio link control service data unit.

In one embodiment, a method comprises: receiving at least a portion of a radio link control service data unit; and receiving first information indicating to discard the radio link control service data unit after receiving at least the portion of the radio link control data unit.

In certain embodiments, the method comprises transmitting second information indicating to discard the radio link control service data unit.

In some embodiments, transmitting the second information comprises transmitting the second information via a radio link control control message.

In various embodiments, transmitting the second information comprises transmitting the second information via a data delivery status data message.

In one embodiment, the data deliver status message indicates the radio link control service data unit to be discarded.

In certain embodiments, at least the portion of the radio link control service data unit comprises an entire radio link control service data unit.

In some embodiments, the first information indicating to discard the radio link control service data unit comprises an indication of the radio link control service data unit to be discarded.

In various embodiments, the indication of radio link control service data unit to be discarded comprises a sequence number corresponding to the radio link control service data unit to be discarded.

In one embodiment, the first information indicating to discard the radio link control service data unit comprises the sequence number and an empty payload.

In certain embodiments, the first information indicating to discard the radio link control service data unit comprises the sequence number and a payload comprising data indicating a radio link control service data unit to be discarded.

In some embodiments, receiving first information indicating to discard the radio link control service data unit comprises receiving the first information via a radio link control control message.

In various embodiments, the method comprises discarding the radio link control service data unit in response to receiving the first information indicating to discard the radio link control service data unit.

In one embodiment, an apparatus comprises: a receiver that: receives at least a portion of a radio link control service data unit; and receives first information indicating to discard the radio link control service data unit after receiving at least the portion of the radio link control data unit.

In certain embodiments, the apparatus comprises a transmitter that transmits second information indicating to discard the radio link control service data unit.

In some embodiments, the transmitter transmits the second information by transmitting the second information via a radio link control control message.

In various embodiments, the transmitter transmits the second information by transmitting the second information via a data delivery status data message.

In one embodiment, the data deliver status message indicates the radio link control service data unit to be discarded.

In certain embodiments, at least the portion of the radio link control service data unit comprises an entire radio link control service data unit.

In some embodiments, the first information indicating to discard the radio link control service data unit comprises an indication of the radio link control service data unit to be discarded.

In various embodiments, the indication of radio link control service data unit to be discarded comprises a sequence number corresponding to the radio link control service data unit to be discarded.

In one embodiment, the first information indicating to discard the radio link control service data unit comprises the sequence number and an empty payload.

In certain embodiments, the first information indicating to discard the radio link control service data unit comprises the sequence number and a payload comprising data indicating a radio link control service data unit to be discarded.

In some embodiments, the receiver receives first information indicating to discard the radio link control service data unit by receiving the first information via a radio link control control message.

In various embodiments, the processor discards the radio link control service data unit in response to receiving the first information indicating to discard the radio link control service data unit.

In one embodiment, a method comprises: receiving at least a portion of a radio link control service data unit; starting a timer in response to receiving at least the portion of the radio link control service data unit; and in response to the timer expiring, discarding at least the portion of the radio link control service data unit.

In certain embodiments, the method comprises receiving information indicating a starting value for the timer.

In some embodiments, the starting value for the timer is determined based on quality of service requirements, a number of hops, or a combination thereof.

In one embodiment, an apparatus comprises: a receiver that receives at least a portion of a radio link control service data unit; and a processor that: starts a timer in response to receiving at least the portion of the radio link control service data unit; and in response to the timer expiring, discards at least the portion of the radio link control service data unit.

In certain embodiments, the receiver receives information indicating a starting value for the timer.

In some embodiments, the starting value for the timer is determined based on quality of service requirements, a number of hops, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a first device, the method comprising:
   sending at least a portion of a radio link control service data unit to a second device;
   receiving an indication from a packet data convergence protocol layer to discard the radio link control service data unit after sending at least the portion of the radio link control service data unit; and
   in response to receiving the indication to discard the radio link control service data unit, transmitting information to the second device indicating to discard the radio link control service data unit, wherein the information comprises an indication of the radio link control service data unit to be discarded, and the indication of the radio link control service data unit to be discarded comprises a sequence number corresponding to the radio link control service data unit to be discarded and either:
   an empty payload; or
   a payload comprising data indicating the radio link control service data unit to be discarded.

2. The method of claim 1, wherein sending at least the portion of the radio link control service data unit comprises transmitting at least the portion of the radio link control service data unit to an integrated access backhaul node.

3. The method of claim 1, wherein sending at least the portion of the radio link control service data unit comprises submitting at least the portion of the radio link control service data unit to a lower layer for transmission.

4. The method of claim 1, wherein the information indicating to discard the radio link control service data unit comprises an indication of the radio link control service data unit to be discarded.

5. The method of claim 4, wherein the indication of radio link control service data unit to be discarded comprises a sequence number corresponding to the radio link control service data unit to be discarded.

6. The method of claim 1, wherein transmitting the information indicating to discard the radio link control service data unit comprises transmitting the information via a radio link control control message.

7. The method of claim 1, further comprising discarding the radio link control service data unit in response to receiving the indication from the packet data convergence protocol layer.

8. A method comprising:
receiving at least a portion of a radio link control service data unit from a first device; and
receiving first information from the first device indicating to discard the radio link control service data unit after receiving at least the portion of the radio link control data unit, wherein the first information comprises an indication of the radio link control service data unit to be discarded, and the indication of the radio link control service data unit to be discarded comprises a sequence number corresponding to the radio link control service data unit to be discarded and either:
an empty payload; or
a payload comprising data indicating the radio link control service data unit to be discarded.

9. The method of claim 8, further comprising transmitting second information indicating to discard the radio link control service data unit.

10. The method of claim 9, wherein transmitting the second information comprises transmitting the second information via a data delivery status data message.

11. The method of claim 10, wherein the data deliver status message indicates the radio link control service data unit to be discarded.

12. The method of claim 8, wherein at least the portion of the radio link control service data unit comprises an entire radio link control service data unit.

13. The method of claim 8, wherein the first information indicating to discard the radio link control service data unit comprises an indication of the radio link control service data unit to be discarded.

14. The method of claim 13, wherein the indication of radio link control service data unit to be discarded comprises a sequence number corresponding to the radio link control service data unit to be discarded.

15. The method of claim 8, further comprising discarding the radio link control service data unit in response to receiving the first information indicating to discard the radio link control service data unit.

16. A method comprising:
receiving at least a portion of a radio link control service data unit from a first device;
starting a timer in response to receiving at least the portion of the radio link control service data unit;
in response to the timer expiring, discarding at least the portion of the radio link control service data unit; and
transmitting information to the first device indicating that at least the portion of the radio link control service data unit is discarded, wherein the information comprises an indication of the radio link control service data unit to be discarded, and the indication of the radio link control service data unit to be discarded comprises a sequence number corresponding to the radio link control service data unit to be discarded and either:
an empty payload; or
a payload comprising data indicating the radio link control service data unit to be discarded.

17. The method of claim 16, further comprising receiving information indicating a starting value for the timer.

18. The method of claim 17, wherein the starting value for the timer is determined based on quality of service requirements, a number of hops, or a combination thereof.

* * * * *